United States Patent
Zucchelli et al.

(10) Patent No.: US 11,807,735 B2
(45) Date of Patent: Nov. 7, 2023

(54) POLYOLEFINS HALOGEN-FREE FLAME RETARDANT MOULDING COMPOSITIONS COMPRISING AN INORGANIC HYPOPHOSPHOROUS ACID METAL SALT

(71) Applicant: ITALMATCH CHEMICALS S.P.A., Arese (IT)

(72) Inventors: Ugo Zucchelli, Arese (IT); Vincenza Morone, Arese (IT)

(73) Assignee: ITALMATCH CHEMICALS S.P.A., Arese Mi (IT)

( * ) Notice: Subject to any disclaimer, the term of this patent is extended or adjusted under 35 U.S.C. 154(b) by 246 days.

(21) Appl. No.: 17/298,666

(22) PCT Filed: Dec. 3, 2018

(86) PCT No.: PCT/IB2018/059562
§ 371 (c)(1),
(2) Date: May 31, 2021

(87) PCT Pub. No.: WO2020/115522
PCT Pub. Date: Jun. 11, 2020

(65) Prior Publication Data
US 2022/0017725 A1  Jan. 20, 2022

(51) Int. Cl.
C08K 13/02    (2006.01)
C08J 3/22     (2006.01)
C09K 21/04    (2006.01)
C09K 21/10    (2006.01)
C09K 21/12    (2006.01)
C08J 3/12     (2006.01)
C08K 3/32     (2006.01)
C08K 3/36     (2006.01)
C08K 5/3435   (2006.01)
C08K 5/5313   (2006.01)
C08K 3/22     (2006.01)

(52) U.S. Cl.
CPC ............... *C08K 13/02* (2013.01); *C08J 3/12* (2013.01); *C08J 3/226* (2013.01); *C09K 21/04* (2013.01); *C09K 21/10* (2013.01); *C09K 21/12* (2013.01); *C08K 3/32* (2013.01); *C08K 3/36* (2013.01); *C08K 5/3435* (2013.01); *C08K 5/5313* (2013.01); *C08K 2003/2227* (2013.01); *C08K 2201/014* (2013.01)

(58) Field of Classification Search
CPC .......... C08K 3/32; C08K 3/34; C08K 5/3435; C08L 23/00
See application file for complete search history.

(56) References Cited

U.S. PATENT DOCUMENTS

| | | |
|---|---|---|
| 4,174,343 A | 11/1979 | Hardy et al. |
| 5,973,194 A | 10/1999 | Weferling et al. |
| 6,011,720 A | 1/2000 | Tanaka |
| 6,090,968 A | 7/2000 | Horold et al. |
| 6,117,995 A | 9/2000 | Zedda et al. |
| 6,278,012 B1 | 8/2001 | Horold et al. |
| 6,300,516 B1 | 10/2001 | Weferling et al. |
| 6,329,544 B1 | 12/2001 | Weferling et al. |
| 6,355,832 B1 | 3/2002 | Weferling et al. |
| 6,359,171 B1 | 3/2002 | Weferling et al. |
| 2002/0079480 A1 | 6/2002 | Sicken et al. |
| 2003/0073865 A1 | 4/2003 | Sicken et al. |
| 2005/0137418 A1 | 6/2005 | Bauer et al. |
| 2006/0074157 A1 | 4/2006 | Bauer et al. |

FOREIGN PATENT DOCUMENTS

| | | | |
|---|---|---|---|
| CA | 2641112 | 6/1999 | |
| DE | 19910232 | 7/2000 | |
| EP | 6568 | 6/1979 | |
| EP | 0792911 | 9/1997 | |
| EP | 699708 | 4/2000 | |
| EP | 1016623 | 7/2000 | |
| WO | 9900450 | 1/1999 | |
| WO | 2005044906 | 5/2005 | |
| WO | 2005075566 | 8/2005 | |
| WO | 2005121232 | 12/2005 | |
| WO | 2007010318 | 1/2007 | |
| WO | 2009010812 | 1/2009 | |
| WO | 2009080554 | 7/2009 | |
| WO | WO-2009080554 A1 * | 7/2009 | ............... C08J 3/22 |
| WO | 2011117266 | 9/2011 | |
| WO | WO-2011117266 A1 * | 9/2011 | ........... C08K 5/0066 |
| WO | 2011163207 | 12/2011 | |
| WO | 2012168746 | 12/2012 | |

(Continued)

OTHER PUBLICATIONS

Kashiwagi (Flame Retardant Mechanism of Silica Gel/Silica, Fire and Materials, 2000, 24, 277-289).*
Braun (Rheology Modifiers Handbook: Practial Use and Application, Norwich, NY, USA, 2000, p. 70).*
Alfa (Tris(tribromoneopentyl)phosphate, Alfa Chemistry, 2023, 8 pages).*
International Search Report issued by the EPO dated Aug. 26, 2019 for International patent application No. PCT/IB2018/059562.
Karen, P.; McArdle, P.; Takats, J. (2016). "Comprehensive definition of oxidation state (IUPAC Recommendations 2016)". Pure Appl. Chem. 88: 831-839.

*Primary Examiner* — Brieann R Johnston

(57) ABSTRACT

The present invention relates to halogen-free flame retardant compositions, comprising polyolefins polymers as active ingredient and a flame retardant system. The flame retardant system comprises at least an Hypophosphorous acid metal salt (preferred is Aluminium hypophosphite) as main flame retardant component, at least a sterically hindered N-alkoxyamine with a specific structure as first flame retardant synergic component, at least a silicon oxide or aluminium oxide or a mixture thereof with specific properties as second flame retardant synergic component.

14 Claims, No Drawings

(56) References Cited

FOREIGN PATENT DOCUMENTS

| | | | |
|---|---|---|---|
| WO | 2013045966 | 4/2013 | |
| WO | 2013136285 | 9/2013 | |
| WO | WO-2013136285 A1 * | 9/2013 | ........... C07D 211/94 |
| WO | 2014013284 | 1/2014 | |
| WO | 2014121804 | 8/2014 | |
| WO | 2015087099 | 6/2015 | |

* cited by examiner

POLYOLEFINS HALOGEN-FREE FLAME RETARDANT MOULDING COMPOSITIONS COMPRISING AN INORGANIC HYPOPHOSPHOROUS ACID METAL SALT

This application is a U.S. national stage of PCT/IB2018/059562 filed on 3 Dec. 2018.

The present invention relates to halogen-free flame retardant compositions, comprising polyolefins polymers as active ingredient and a flame retardant system. The flame retardant system comprises at least an Hypophosphorous acid metal salt (preferred is Aluminium hypophosphite) as main flame retardant component, at least a sterically hindered N-alkoxyamine with a specific structure as first flame retardant synergic component, at least a silicon oxide or aluminium oxide or a mixture thereof with specific properties as second flame retardant synergic component.

BACKGROUND OF THE INVENTION

The chemical structure and the technical characteristic of organic polymers make them easily combustible. A wide variety of flame retardant additives is blend into plastics to achieve stringent standards demanded by processors and even by legislation.

Recently, despite the fact that traditional brominated flame retardant additives are well suited for most application, some preference is given to halogen free flame retardant additives because of environmental as well as safety reasons. Therefore, halogen free flame retardant additives are of increasing interest in the thermoplastic polymers market.

According to the present invention, polyolefin polymers or polar polyolefin polymers represent the polymer component.

The term polyolefin is intended for both olefin homo- and co-polymers. Examples of polyolefins include homopolymers or copolymers of ethylene, propylene, butene, hexene, isoprene, octene. Preferably, polyolefins according to the present invention include: PP (Poly Propylene), LDPE (Low Density Poly Ethylene), LLDPE (Linear Low Density Poly Ethylene), VLDPE (Very Low Density Poly Ethylene), MDPE (Medium Density Poly Ethylene), HDPE (High Density Poly Ethylene), EPR (Ethylene Propylene Rubber), EPDM (Ethylene Propylene Diene Monomer) and Plastomers or Poly Olefin Elastomers like ethylene 1-octene or ethylene 1-hexene produced with single site catalyst technology.

The term polar polyolefins is intended for copolymers of olefin with polar co-monomers, like vinyl acetate, alkyl acrylates, methacrylates, acrylic acids, methacrylic acid, acrylonitrile and styrene. Examples of polar polyolefins according to the present invention include EVA (Ethylene Vinyl Acetate), EVM (Ethylene Vinyl Monomer rubbers, the segment of EVA copolymers with vinyl acetate content between 40% and 90%), EBA (Ethylene Butyl Acrylate), EEA (Ethylene Ethylene Acrylate), EMA (Ethylene Methyl Acrylate).

Many excellent known flame retardant compounds are represented by organic or inorganic phosphorus-containing compounds in which the phosphorus atom has an oxidation state ranging from −3 to +5. A definition of the term oxidation state has been for example published by Karen, P.; McArdle, P.; Takats, J. (2016). "Comprehensive definition of oxidation state (IUPAC Recommendations 2016)". *Pure Appl. Chem.* 88: 831-839.

Phosphorus-containing compounds of oxidation state ranging from −3 to +5 are derived from phosphine (−3), phosphine oxide (−1), elemental phosphorus (+0), hypophosphorous acid (+1), phosphorous acid (+3) and phosphoric acid (+5).

Independent from the oxidation state, organic phosphorus compounds are less convenient and more difficult to produce than inorganic phosphorus compounds, also because inorganic phosphorus compounds represent the raw materials used for organic phosphorus synthesis.

The lower oxidation state of phosphorus (−3) is Phosphine, an inorganic compound having the chemical formula $PH_3$. It is a colorless, flammable, toxic gas that has been shown to be effective as a flame inhibitor, but not possible to be used as such as a flame retardant. Examples of organic phosphorus compounds of the phosphine class, having the oxidation state −3, are aromatic phosphines.

Phosphorus compounds of the oxidation state −1 are derived from phosphine oxide. The inorganic parent compound phosphine oxide ($H_3PO$) is unstable. Examples of organic phosphine oxides, having the oxidation state −1, are triphenylphosphine oxide, tritolylphosphine oxide, trisnonylphenylphosphine oxide, tricyclohexylphosphine oxide, tris(n-butyl)phosphine oxide, tris(n-hexyl)phosphine oxide, tris(n-octyl)phosphine oxide, tris(cyanoethyl)phosphine oxide, benzylbis(cyclohexyl)phosphine oxide, benzylbisphenylphosphine oxide, phenylbis(n-hexyl)phosphine oxide.

Phosphorus of the oxidation state ±0 is elemental phosphorus. Examples are red and black phosphorus.

Phosphorus compounds of the oxidation state +1 are derived from hypophosphorous acid. Examples of hypophosphorous acid salts or hypophosphite, having oxidation state +1, are calcium hypophosphite and aluminium hypophosphite. Example of organic hypophosphite or phosphinate metal salts, having oxidation state +1, are zinc aluminium diethyl phosphinate and aluminium diethyl phosphinate.

Phosphorus compounds of the oxidation state +3 are derived from phosphorous acid. Example of phosphorus acid salts or phosphite, having oxidation state +3, is aluminium phosphite. Example of organic phosphite, having oxidation state +3, is triphenyl phosphite. Examples of organic phosphonate, having oxidation state +3, are pentaerytritol-di-methyl phosphonate or 9,10-dihydro-9-oxa-10-phosphaphenanthrene-10-oxide. Example of organic metal phosphonate, having oxidation state +3, is aluminium methyl methyl phosphonate.

Phosphorus compounds of the oxidation state +5 are derived from phosphorus acid. Examples of phosphoric acid salts or phosphate, having oxidation state +5, are melamine phosphate or ammonium polyphosphate or melamine polyphosphate. Examples of organic phosphate, having oxidation state +5, are resorcinol bis dixylenyl phosphate and triphenyl phosphate.

Lower oxidation state compounds are generally more efficient flame retardants than higher oxidation state compounds, because the release of phosphorus-containing volatiles, that contribute to the extinction of the flame, decreases with oxidation state of the phosphorus.

Organic phosphine and organic phosphine oxide compound (oxidation state −3 and −1) are relatively low thermal stable and are produced with relative complex synthesis path. Organic phosphine and phosphine oxide found their main applications in thermoset polymers like epoxy, polyester, polyurethane.

Red phosphorous is one of the most important flame retardant system for a wide range of polymer materials, especially for oxygen containing polymers. The main drawback of red phosphorus as a flame retardant for polymer systems is its intrinsic dark colour.

Organic metal phosphinates (oxidation state +1) are a new family of halogen free flame retardant agents, particularly efficient in polyamides and polyesters, especially when used in conjunction with a melamine containing product, the resulting mixture being more effective than organic metal phosphinates alone. These products, with particular regard to zinc and especially aluminium diethyl phosphinate, are currently commercially available under the "Exolit OP" brand. This family of organic metal phosphinates was firstly described as flame retardant agents for example in EP 699708 and EP6568.

Different processes for the preparation of Organic metal phosphinates are described, for instance in: CA 2641112, U.S. Pat. Nos. 6,300,516, 5,973,194, 601,172, DE 19910232, U.S. Pat. No. 6,090,968, EP 1016623, U.S. Pat. Nos. 6,329,544, 6,355,832, 6,359,171, 6,278,012, US 2003073865, US 2002079480, US 2006074157, US 2005137418.

Organic metal phosphonates (oxidation state +3) are also an option. AMMP (Aluminium Methyl Methyl Phosphonate) is an example, and it can be produced as described, for example, in WO2011/163207.

Organic phosphonate (oxidation state +3) are also widely used as flame retardant. The use of a large number of diphosphonates as flame retardant agents in different polymer and copolymer is disclosed in U.S. Pat. No. 4,174,343.

Despite organic metal phosphinates, organic metal phosphonates and organic phosphonates are satisfactory in terms of overall performances, there is however still a need for simpler molecules that could be produced in an easier and less expensive way.

The composition of present invention comprises an Hypophosphorus acid metal salts, also called inorganic Phosphinate or Hypophosphite salt (phosphorus valence state +1). Hypophosphites have been reported as effective halogen free flame retardant additives for polymers.

Hypophosphites have the following chemical formula:

where:

"n" is an integer number ranging from 1 to 4 in dependence of the valence of the metal Me. The metal is any atom belonging to groups I, II, III and IV of the periodic table of the elements. Preferred metals are Aluminium and Calcium.

Sodium and calcium Hypophosphites are currently widely commercially available and they are normally produced by reacting the corresponding metal hydroxide on yellow phosphorus, for instance according to the following reaction scheme:

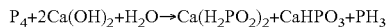

Hypophosphites of metals other than Calcium and Sodium are normally produced through the hypophosphorus acid reaction on the metal hydroxide or by exchange reaction with the corresponding soluble metal salts.

Thermoplastic flame retardant compositions comprising Hypophosphite in many polymers different from polyolefins are known in the art.

Thermoplastic compositions comprising a Hypophosphite as flame retardant agent and an aromatic polycarbonate resin are described in the art, for example in WO2005/044906.

Thermoplastic compositions comprising a Hypophosphite as flame retardant agent and a polyester resin is described in the art, for example in WO2005/121232.

Thermoplastic compositions comprising a Hypophosphite as flame retardant agent and thermoplastic polyamides are described in the art, for example in WO2005/075566, WO 2013/045966 and WO2015/087099.

A surface coated Hypophosphite as flame retardant agent used for polymeric compositions, particularly thermoplastic polyester or polyamides is described in the art, for example in WO 2009/010812.

Thermoplastic compositions comprising a Hypophosphite as flame retardant agent and thermoplastic polystyrene are described in the art, for example in WO2012/168746.

PVC flame retarded through a Hypophosphorus acid metal salts is described in WO2014/013284.

In addition, some thermoplastic flame retardant compositions comprising Hypophosphite in polyolefins are known in the art.

Thermoplastic compositions comprising an Hypophosphite as flame retardant agent and thermoplastic polyolefins are described in WO 2014/121804.

According to WO2014/121804 however, thermoplastic and/or crosslinked polyolefins or polar olefins are flame retarded by a combination of at least a metal Hypophosphite and at least a metal hydrate, where the ratio metal Hypophosphite to metal hydrate is in the range 1/100 to 1/3 by weight.

Accordingly, WO2014/121804 describes that the Hypophosphite is a synergic agent with respect to the metal hydrate, this latter being essential in excess.

According to WO2007/010318 polyolefin polymers, particularly polypropylene compositions are made flame retarded by incorporating a synergic mixture of an Hypophosphite and an halogenated compound. However, polymers compositions containing halogen are not the object of the present invention and are out of the scope of present protection.

Furthermore, N-alkoxy amine, which have been long used as light or thermal stabilizer, have also flame retardant action as such or as synergic components in addition to traditional flame retardants.

Thermoplastic compositions comprising an N-alkoxy amine as flame retardant agent were firstly disclosed in EP0792911, WO99/00450 and U.S. Pat. No. 6,117,995. However, it is not disclosed how to reach high level of flame retardancy or high level of flame retardancy in absence of halogens.

According to WO2009/080554 polyolefin polymers, particularly polypropylene compositions, are made flame retarded by incorporating a synergic mixture of metal hypophosphite, halogenated organic compounds and one sterically hindered N-alkoxy amine. However, polymers compositions containing halogen are not the object of the present invention.

According to WO2011/117266, a thermoplastic polymer is made flame retarded through an organic or inorganic Phosphinate and one sterically hindered N-alkoxy amine. In the example reported in WO2011/117266, only polypropylene is used as well as only organic metal phosphinate.

According to WO2013/136285, a specific N-alkoxy amine must be used to impart flame retardancy to polymers as such or in combination with some specific phosphorus based compounds. However, only inorganic phosphorus compounds in the oxidation state +5 are disclosed and solely examples with polypropylene and a mixture of the specific N-alkoxy amine and phosphorus flame retardant, are shown.

It has been found that Hypophosphite and sterically hindered N-alkoxy amines are not able to reach high level of flame retardancy at low loading, on a wide range of polyolefins out of polypropylene.

OBJECT OF THE INVENTION

Object of the present invention is to provide halogen-free highly flame retardant compositions based on inorganic phosphinate metal salts effective at a low concentration on a wide range of polyolefins.

In the purpose of present invention, highly flame retardant means rating V2 at 1.6 mm according to international standard UL-94 "Flammability of plastic materials for parts in device and appliances" released by Underwriters Laboratories of the United States.

In the purpose of the present invention, low concentration means below 15% loading by weight, or even more preferably, means below 12% loading by weight.

In the purpose of the present invention, a wide range of polyolefins means at least one or more of the following polymers:

PP (Poly Propylene), LDPE (Low Density Poly Ethylene), LLDPE (Linear Low Density Poly Ethylene), VLDPE (Very Low Density Poly Ethylene), MDPE (Medium Density Poly Ethylene), HDPE (High Density Poly Ethylene), Plastomers or Poly Olefin Elastomers like ethylene 1-ottene or ethylene 1-esene produced with single site catalyst technology, EVA (Ethylene Vinyl Acetate), EBA (Ethylene Butyl Acrylate), EEA (Ethylene Ethylene Acrylate), EMA (Ethylene Methyl Acrylate). Polyolefins mixtures are also included in the purpose of present invention.

Another object of present invention is a dry blend of the Hypophosphite salt, having synergic and activating action, which is free from halogens and is in the form of a powder useful to flame retard a polyolefin polymer for different moulding compounds.

Another object of present invention is a concentrate in pellet form or Masterbatch based on a polyolefin polymer and an Hypophosphite salt, in addition to other synergic components, where the total concentration of additives ranges from about 30% by weight to about 70% by weight for different flame retardant moulding compounds.

Still another object of the present invention is a flame retardant polymer compound in pellet form further used for moulding in different plastic articles based on a polyolefin polymer and an Hypophosphite salt, in addition to other synergic components, where the total concentration of additives ranges from about 1% by weight to about 15% by weight for different moulding compounds.

It can also comprise from 10% to 20% by weight respect to the total composition of a meltable solid organic phosphate flame retardant component in powder form.

Example of different plastic articles are: stadium and theatre seats, injection moulded electrical connectors and boxes, switches, appliances parts, artificial hairs, roofing covers, artificial turfs, pipes and fittings, corrugated pipes, building cables, automotive cables, telecommunication cables, air ducts profiles for ventilation systems, films and films for industrial packaging, fibres for carpets, spun bound and monofilament textiles, windows roller blinds, polyolefin foams for building insulation and industrial packaging.

DESCRIPTION OF THE INVENTION

These and other objects according to the present invention are achieved by a flame-retarded composition consisting of:

a) at least an Hypophosphorus acid metal salt, also named as inorganic Phosphinate or Hypophosphite, where phosphorus valence state is equal to +1, as main flame retardant (FR) component b) at least a sterically hindered N-alkoxyamine having the following molecular structure (I) as a first flame retardant synergic component (FRSYN1)

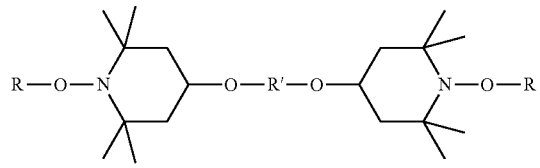

(I)

where R represent $C_1$-$C_{30}$ linear or cyclic alkyl, preferred $C_7$-$C_{12}$, more preferred $C_8$-$C_{11}$ and R' can be C=O or C=O(CH$_2$)$_8$C=O c) at least a silicon or aluminum oxide as second flame retardant synergic component (FRSYN2)

d) at least a thermoplastic polyolefin polymer or polar polyolefin polymer e) fillers and/or reinforcing fibers other conventional additives like pigments, stabilizers, processing aids.

The total percentage of components a) to f) must be 100%.

According to the present invention, said main flame retardant component (FR) is preferably Aluminium Hypophosphite.

First flame retardant synergic component (FRSYN1) is preferably Bis (1-octyloxy-2,2,6,-tetramethyl-4-piperidyl) or 4-Piperidinol, 2,2,6,6-tetramethyl-1-(undecyloxy)-, 4,4'-carbonate.

Second flame retardant synergic component (FRSYN2) is preferably silicon oxide or aluminium oxide or their mixtures with a pH of 3 to 6 (measured on the powder at 4% by weight in water).

The main flame retardant (FR) agent and the first and second flame retardant synergics (FRSYN1 and FRSYN2) total content is preferably lower than 15% by weight with respect to the total composition weight, so that mechanicals and electrical properties are satisfactory with respect to most of the desired applications. Main flame retardant (FR) agent and first and second flame retardant synergics (FRSYN1 and FRSYN2) are preferably added to the polyolefin polymer in the form of a previously prepared powder mix or in the form of a concentrate (or masterbatch).

Further aspects of the present invention, are described here below in more details.

a) Hypophosphorus Acid Metal Salt, Also Called Inorganic Phosphinate or Hypophosphite (FR)

Hypophosphorous acid metal salts contains the higher content of phosphorus in low oxidation state compared to any other molecules, out of pure red phosphorus. Hypophosphorous acid metals salts during decomposition at high temperatures evolve PHs gas that is a very powerful radical scavenger in the gas phase. This make Hypophosphorus acid metal salts very active as flame retardant.

The selection of the most appropriate Hypophosphite is subjected to a number of critical factors. Particularly, suitable hypophosphites must have sufficient thermal stability to overcome melt processing at temperature higher than around 200° C. If they do form hydrates, they must be used in the corresponding anhydrous form and they must not be hygroscopic when successively exposed to ambient humidity. Examples of such Hypophosphites are Aluminium hypophosphite (CAS 7784-22-7), Calcium hypophosphite (CAS 7789-79-9), Manganese hypophosphite (10043-84-2), Magnesium hypophosphite (CAS 10377-57-8), Zinc hypophosphite (CAS 15060-64-7), Barium hypophosphite (CAS 171258-64-3). Most preferred according to the present invention are Aluminium and Calcium Hypophosphites.

Aluminium hypophosphite, corresponding to chemical formula $Al(H_2PO_2)_3$, is currently produced by Italmatch Chemicals Spa (under commercial name "Phoslite IP-A") in a white powder form with a low humidity level, high purity and different PSD suitable for thermoplastic processing.

Calcium hypophosphite, corresponding to chemical formula $Ca(H_2PO_2)_2$, is also currently produced by Italmatch Chemicals Spa (under commercial name "Phoslite IP-C") This compound shows in most cases similar or lower flame retardant performances when compared to Aluminium hypophosphite. However, it can be advantageously used in those applications where thermal resistance of Aluminium hypophosphite would be critical. Aluminium and Calcium hypophosphites, being flammable powders as most of anhydrous hypophosphites, are often commercialized as a dry blend powder with other solid flame retardant agents or even in masterbatch form for easier transport and manipulation.

b) Sterically Hindered N-Alkoxyamine as First Flame Retardant Synergic Component (FRSYN1)

Sterically hindered N-alkoxyamine according to present invention are organic compounds characterized by the following chemical formula (I):

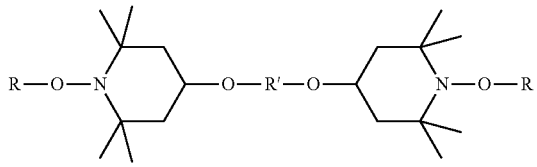

(I)

where R represent $C_1$-$C_{30}$ linear or cyclic alkyl, preferred $C_7$-$C_{12}$, more preferred $C_8$-$C_{11}$
and R' can be C=O or C=O(CH$_2$)$_8$C=O These products are currently commercially available and know to be effective as UV stabilizers in polymers, particularly in presence of acidic species like brominated flame retardant agents. Sterically hindered N-alkoxyamine are also known to act as flame retardant synergic components, according to some specific combinations, in different polymers, especially in polypropylene films and fibers.

c) Silicon Oxide or Aluminium Oxide as a Second Flame Retardant Synergic Component (FRSYN2)

Fumed silica, also known as silica or pyrogenic silica because it is produced in a flame, consists of microscopic droplets of amorphous silica fused into branched, chainlike, three-dimensional secondary particles, which then agglomerate into tertiary particles. Fumed silica serves as a universal thickening agent and an anticaking agent (free-flow agent) in powders, having an high surface area. Like silica gel, it serves as a desiccant. It is used in cosmetics for its light-diffusing properties. It is used as a light abrasive, in products like toothpaste. It is also used in the production of cat litter box filler and as a core material in the production of vacuum insulated panels. It is also used in polymers as filler in silicone elastomer and viscosity adjustment in paints, coatings, printing inks, adhesives and unsaturated polyester resins, as processing aid, anti-blocking and surface modification in thermoplastic polymer, as nucleating agent in foam. Other uses in plastic compounds include controlled migration of additives. A further application of silica and fumed silica is as carrier for liquid additives in masterbatch or compounds production.

Activated alumina is manufactured from aluminium hydroxide by dehydroxylating it in a way that produces a highly porous material. The compound is used as a desiccant (to keep things dry by absorbing water from the air) and as a filter of fluoride, arsenic and selenium in drinking water. It is made of aluminium oxide (alumina; $Al_2O_3$). It has a very high surface-area-to-weight ratio, due to the many "tunnel like" pores that it has. Activated alumina in its phase composition can be represented only by metastable forms (gamma-$Al_2O_3$ etc.). Corundum (alpha-$Al_2O_3$), the only stable form of aluminium oxide, does not have such a chemically active surface and is not used as a sorbent.

Fumed and silica/alumina mixed oxides are also known and used frequently in catalytic applications such as in catalyst washcoats, in extrudates or as raw material for the synthesis of specialty zeolites.

The activity of metal oxides like silica or alumina as synergic flame retardant is also known in the art.

Surprisingly it has been found that only silica or alumina characterized by an acidic pH are very effective in increasing the flame retardant effect of the claimed compositions. When silicon and aluminium oxide have an acidic pH, the high surface is most covered by —OH groups, being effective active in adsorbing both liquids and gases. Without being bound to any theory, it is believed that when under the flame effect, acidic silica or alumina covered by —OH groups adsorb the melt polymer and gas degradation product, retarding the flame propagation.

d) Thermoplastic Polyolefin or Polar Olefin

Polyolefins, preferably polyethylene and polypropylene, can be prepared by 2 different methods: by radical polymerisation (normally under high pressure and at elevated temperature) or by catalytic polymerisation using a catalyst that normally contains one or more than one metal of groups IVb, Vb, VIb or VIII of the Periodic Table. These metals usually have one or more than one ligand, typically oxides, halides, alcoholates, esters, ethers, amines, alkyls, alkenyls and/or aryls. These metal complexes may be in the free form or fixed on substrates, typically on activated magnesium chloride, titanium(III) chloride, alumina or silicon oxide. Mixtures of the polymers mentioned are also in the object of the present invention, for example mixtures of polypropylene with polyethylene (PP/HDPE, PP/LDPE) and mixtures of different types of polyethylene (LDPE/HDPE, LDPE/LLDPE, LLDPE/HDPE or LLDPE/EVA).

e) Fillers and/or Reinforcing Fibers

Example of fillers are glass beads, hollow glass spheres, amorphous silica, chalk, mica, calcinated kaolin, wollastonite, talc, magnesium carbonate, barium sulphate or similar products. They also may have been surface treated with fatty acids or the like, or may have been milled in the presence of fatty acids or the like. Any particulate substance currently available in the market as filler for thermoplastic resins, may be used in the compositions according to the present invention, provided that the average particle size of the powder, when measured by laser instrument, is in the range of about 2 microns to 20 microns.

Examples of preferred reinforcing fibers is glass fibers to be used in the commercially available form of chopped glass. In order to improve compatibility with thermoplastic resins, the reinforcing fiber may have been surface treated with a silane compound. Coupling agents like polypropylene grafted maleic anhydride is normally used to improve mechanical properties. Reinforcing fibers are used in the range from 10% to 50%, preferably from 20% to 35% by weight on the weight of the resin: if the amount of reinforcing fiber is lower than 10%, no advantage is observed in the mechanical properties of the final product, while if the amount is higher than 50% by weight, viscosity of the melt is found too high.

f) Other Conventional Additives

Novel thermoplastic compositions may also contain one or more of the following compounds: processing aids, heat and process stabilizers, UV stabilizers, antidripping agents, pigments, dispersing agents, mould release additives, nucleating agents, partially crosslinked elastic polymers used as impact modifiers, and their mixtures.

EXPERIMENTAL PART

In the following examples, the below listed components were used:

FR (Main Flame Retardant Component):

Aluminium hypophosphite (Phoslite IP-A, by Italmatch Chemicals), hereafter "IP-A"

Calcium hypophosphite (Phoslite IP-C, by Italmatch Chemicals), hereafter "IP-C"

FR for Comparative Examples:

Aluminium salt of di ethyl phosphinic acid (Exolit OP1240, by Clariant), hereafter "OP1240"

Ammonium polyphosphate (Exolit AP 422), hereafter "APP"

FRSYN1 (First Flame Retardant Synergic Component)

Bis (1-octyloxy-2,2,6,-tetramethyl-4-piperidyl) sebacate (Tinuvin 123, by BASF), hereafter "T123"

CAS number: 129757-67-1

Chemical formula:

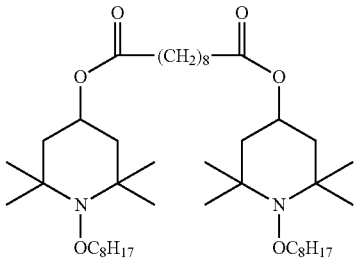

4-Piperidinol, 2,2,6,6-tetramethyl-1-(undecyloxy)-, 4,4'-carbonate (ADK STAB LA81, by Adeka), hereafter "LA81"

CAS number: 705257-84-7

Chemical formula:

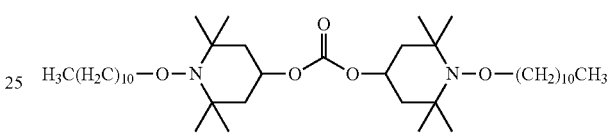

FRSYN for Comparative Examples 1,6-Hexanediamine,N1,N6-bis(2,2,6,6-tetramethyl-4-piperidinyl)-, polymer with 2,4,6-trichloro-1,3,5-triazine, reaction products with 3-bromo-1-propene,N-butyl-1-butanamine and N-butyl-2,2,6,6-tetramethyl-4-piperidinamine, oxidized, hydrogenated (Tinuvin NOR371, by BASF), hereafter "NOR371"

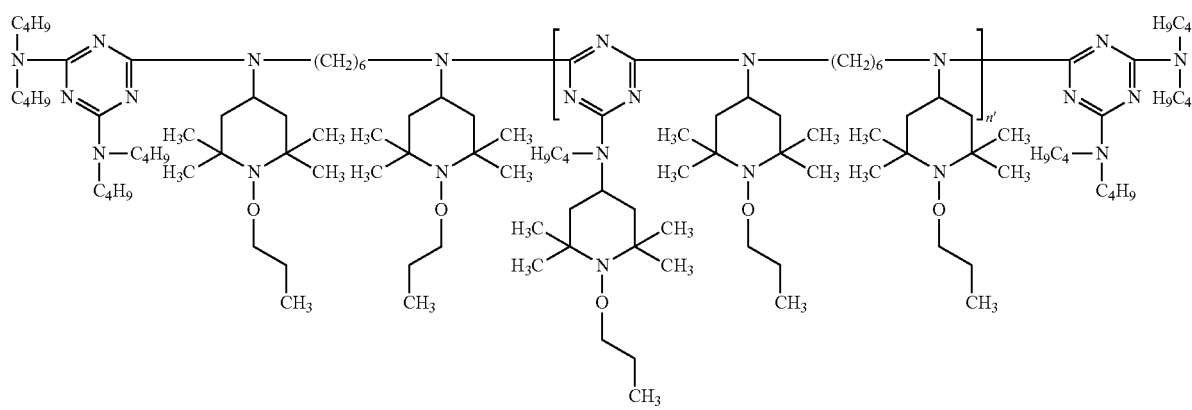

N-alkoxy Hindered Amine Reaction Products CAS 191680-81-6 (Flamestab NOR 116, by BASF), hereafter "NOR116"

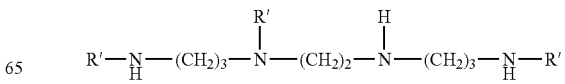

where R' is

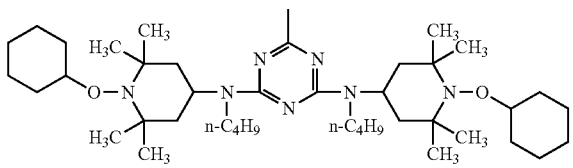

In the following table 1 are reported the molecular weight and molecular weight equivalents of N-alkoxy groups in the different synergics used. We highlight that the number of N-alkoxy groups in the different molecules is substantially the same, as a consequence a similar flame retardancy activity would be expected. Surprisingly, only the claimed synergics have shown to be effective. Without being bound to any theory, it has been hypothesized that the tertiary amines groups present in the comparative examples N-alkoxyamine act as a powerful radical scavenger decreasing the overall efficiency of the molecule as flame retardant.

Tab. 1

| FRSYN1 | T123 | LA81 | NOR371 | NOR 116 |
|---|---|---|---|---|
| Molecular Weight (g/mol) | 737 | 681 | 2890 (xn = 2)* | 2261** |
| Number of N-alkoxy groups | 2 | 2 | 8 | 6 |
| N-alkoxy groups (g/mol) | 369 | 341 | 361 | 377 |

*Chemicals Notification and Assessment File No.: NA/910 (August 2011)
**Technical Datasheet BASF FRSYN2 (Second Flame Retardant Synergic Component)
Fumed silica (Cab-o-sil M5, by Cabot) with pH=3.6-4.3 (4% in $H_2O$), hereafter "Cab-o-sil M5"
Fumed alumina (Aeroxide Alu 130, by Evonik) with pH=4.4-5.4 (4% in $H_2O$), hereafter "Aeroxide Alu 130"
Fumed silica (Aerosil 200, by Evonik) with pH=3.7-4.7 (4% in $H_2O$), hereafter "Aerosil 200"
Fumed mixed alumina/silica (Aerosil MOX 170, by Evonik) with pH=3.6-4.5 (4% in $H_2O$), hereafter called "Aerosil MOX 170"
FRSYN2 for Comparative Examples
Amorphous Silica (Sidistar T120, by Elkem) with pH=7-9 (4% in $H_2O$), hereafter "Sidistar T120"
Alumina (Martoxid™ 2250, by Huber) with pH=7-9 (4% in $H_2O$), hereafter "Martoxid™ 2250"
Polymers:
Polyolefins
HDPE: Eraclene ML 70 (Medium-low molecular weight HDPE homopolymer from slurry process, MFR 190° C./2.16 kg=2-3 gr/10', density=0.951 gr/cc) LDPE: Riblene MP 30 (Medium molecular weight LDPE, MFR 190° C./2.16 kg=7.5 gr/10', density=0.925 gr/cc)
LLDPE: Flexirene FG30 (Medium molecular weight ethylene-butene copolymer, MFR 190° C./2.16 kg=1 gr/10', density=0.92 gr/cc)
PP: Moplen HP500N (PP homopolymer, MFR 230° C. 2.16 kg=12 gr/10')
PP glass fiber reinforced (Rialglass H07S30G, Polypropylene homopolymer 30% glass fiber reinforced, chemically coupled)
Polar Polyolefins
EVA: Greenflex ML 30 (Ethyelene Vinyl Acetate copolymers with VA=9%; MFR 190° C./2.16 kg=2.5 gr/10')

Stabilizers:
Hindered phenol heat stabilizer (Irganox 1010, by Ciba), hereafter "Irg. 1010"
Phosphite process stabiliser (Irgaphos 168, by Ciba), hereafter "Irg. 168"
Examples according to the invention (from E.1 to E. 18) and Comparative Examples (from C.1 to C.20) are reported in the tables below
Experimental Procedure
All components reported in Examples and Comparative Examples are extruded in a 24 mm twin screw extruder with a temperature profile in the range 220-230° C. Polymer pellets are previously cut mechanically to lower size in a high speed milling machine. Grinded polymers, liquids and solid additives are premixed in a low speed lab internal mixer and add to first hopper of the twin screw extruder. The extruded polymer pellets are dried in an oven at 90° C. before injection moulding in UL-94 specimens at 1.6 mm and 5 specimens were conditioned for 24 hours at 23° C. and 50% humidity. Flammability have been reported according to UL-94 procedure. When tests do not meet V0, V1 and V2 an NC classification has been given,
Comments to Table 1 (Example from C.1 to C.14)
In table 1 (C.1 to C.12) combinations are shown according to previous art (WO 2011/117266) where a thermoplastic polymer is made flame retardant by an organic or inorganic phosphinate and one sterically hindered N-alkoxy amine. However, the comparative examples here reported show that the combinations fail to fulfil the high flame retardancy level in HDPE. Examples reported in WO 2011/117266 refers only to PP.
Comparative example C.13 and C.14 are according to compositions claimed in WO2013/136285. Mixtures of inorganic phosphorus compound (APP) in oxidation state +5 and N-alkoxyamine with a structure claimed in the present invention, fail to obtain a good flame behaviour when used in HDPE.
Comments to Table 2 (Example from E.1 to E.6 and Comparative Example from C.15 to C.20)
In table 2 (E.1 to E.6) it is reported that the addition of silicon oxide (Cab-o-sil M5) to inorganic hypophosphite (IP-A) and N-alkoxyamine with the specific structure claimed (T123 and LA81) surprisingly shows an high level of flame retardancy in HDPE polymer.
Comparing C.15, C.16 to E.1 it is shown how the flame retardant effectiveness needs the presence of three components IP-A, Cab-o-sil M5 and T123 Comparative Examples C.17 to C.20 show that Cab-o-sil M5 and IP-A with N-alkoxyamine not represented by the structure here claimed (NOR371 and NOR116) does not reach good level of flame retardancy.
Comments to Table 3 (Examples from E. 7 to E.9 e Comparison Examples C.21 and C.22)
In Examples E.7, E8, E9 it is demonstrated the high effectiveness of different grades silicon oxide and aluminium oxide and mixtures with acidic pH. Comparison examples C.21, C.22 demonstrate that silicon oxide (Sidistar T120) and aluminium oxide (Martoxid™ 2250) with basic pH do not show the high flame retardancy effect.
Comments to Table 4 (Examples from E.10 to E.18)
In Examples from E.10 to E.16 it is demonstrated the high effectiveness of combinations according to present invention on different polyolefins and polar polyolefins polymers (LLDPE, LDPE, PP and EVA). Example E.18 show the effectiveness of combinations here claimed also in a PP glass fibre compound.

TABLE 1

| | C.1 | C.2 | C.3 | C.4 | C.5 | C.6 | C.7 | C.8 | C.9 | C.10 | C.11 | C.12 | C.13 | C.14 |
|---|---|---|---|---|---|---|---|---|---|---|---|---|---|---|
| HDPE | 88.9% | 88.2% | 88.9% | 88.2% | 88.9% | 88.2% | 88.9% | 88.2% | 88.9% | 88.2% | 78.9% | 78.2% | 88.9% | 88.2% |
| IP-A | 10% | 10% | 10% | 10% | 10% | 10% | 10% | 10% | — | — | 20% | 20% | — | — |
| OP1240 | — | — | — | — | — | — | — | — | 10% | 10% | — | — | — | — |
| APP | | | | | | | | | | | | | 10% | 10% |
| NOR371 | 0.7% | 1.4% | — | — | — | — | — | — | 0.7% | 1.4% | 0.7% | 1.4% | | |
| NOR116 | — | — | 0.7% | 1.4% | — | — | — | — | — | — | — | — | — | — |
| T123 | — | — | — | — | 0.7% | 1.4% | — | — | — | — | — | — | — | — |
| LA81 | — | — | — | — | — | — | 0.7% | 1.4% | — | — | — | — | 0.7% | 1.4% |
| Irg. 1010 | 0.1% | 0.1% | 0.1% | 0.1% | 0.1% | 0.1% | 0.1% | 0.1% | 0.1% | 0.1% | 0.1% | 0.1% | 0.1% | 0.1% |
| Irg. 168 | 0.3% | 0.3% | 0.3% | 0.3% | 0.3% | 0.3% | 0.3% | 0.3% | 0.3% | 0.3% | 0.3% | 0.3% | 0.3% | 0.3% |
| UL-94 1.6 mm | NC | NC | NC | NC | NC | NC | NC | NC | NC | NC | NC | NC | NC | NC |

TABLE 2

| | C.15 | C.16 | E.1 | E.2 | E.3 | E.4 | E.5 | E.6 | C.17 | C.18 | C.19 | C.20 |
|---|---|---|---|---|---|---|---|---|---|---|---|---|
| HDPE | 79.6% | 88.2% | 88.2% | 88.2% | 88.2% | 88.2% | 88.2% | 88.2% | 88.2% | 86.8% | 88.2% | 86.8% |
| IP-A | 20% | 10% | 10% | 10% | 10% | 10% | 10% | 10% | 10% | 10% | 10% | 10% |
| T123 | — | — | 0.7% | 0.4% | 1.0% | — | — | — | — | — | — | — |
| LA81 | — | — | — | — | — | 0.7% | 0.4% | 1.0% | — | — | — | — |
| NOR371 | — | — | — | — | — | — | — | — | 0.7% | 1.4% | — | — |
| NOR116 | — | — | — | — | — | — | — | — | — | — | 0.7% | 1.4% |
| Cab-o-sil M5 | — | 1.4% | 0.7% | 1.0% | 0.4% | 0.7% | 1.0% | 0.4% | 0.7% | 1.4% | 0.7% | 1.4% |
| Irg. 1010 | 0.1% | 0.1% | 0.1% | 0.1% | 0.1% | 0.1% | 0.1% | 0.1% | 0.1% | 0.1% | 0.1% | 0.1% |
| Irg. 168 | 0.3% | 0.3% | 0.3% | 0.3% | 0.3% | 0.3% | 0.3% | 0.3% | 0.3% | 0.3% | 0.3% | 0.3% |
| UL-94 1.6 mm | NC | NC | V2 | V2 | V2 | V2 | V2 | V2 | NC | NC | NC | NC |

TABLE 3

| | E.7 | E.8 | E.9 | C.21 | C.22 |
|---|---|---|---|---|---|
| HOPE | 88.2% | 88.2% | 88.2% | 88.2% | 88.2% |
| IP-A | 10% | 10% | 10% | 10% | 10% |
| LA81 | 0.7% | 0.7% | 0.7% | 0.7% | 0.7% |
| Aeroxide Alu 130 | 0.7% | — | — | — | — |
| Aerosil 200 | — | 0.7% | — | — | — |
| Aerosil MOX 170 | — | — | 0.7% | — | — |
| Sidistar T120 | — | — | — | 0.7% | — |
| Martoxid TM 2250 | — | — | — | — | 0.7% |
| Irg.1010 | 0.1% | 0.1% | 0.1% | 0.1% | 0.1% |
| Irg.168 | 0.3% | 0.3% | 0.3% | 0.3% | 0.3% |
| UL-94 1.6 mm | V2 | V2 | V2 | NC | NC |

TABLE 4

| | E.10 | E.11 | E.12 | E.13 | E.14 | E.15 | E.16 | E.17 | E.18 |
|---|---|---|---|---|---|---|---|---|---|
| LLDPE | 90.6% | 90.6% | — | — | — | — | 90.6% | — | — |
| LDPE | — | — | 90.6% | 90.6% | — | — | — | — | — |
| EVA | — | — | — | — | 90.6% | 90.6% | — | — | — |
| PP | | | | | | | | 95.1 | — |
| PP GF30% | | | | | | | | — | 95.1% |
| IP-A | 8% | 8% | 8% | 8% | 8% | | | 4% | 4% |
| IP-C | — | — | — | — | — | 8% | 8% | — | — |
| T123 | 0.6% | — | 0.6% | — | — | — | — | — | — |
| LA81 | — | 0.6% | — | 0.6% | 0.6% | 0.6% | 0.6% | 0.3% | 0.3% |
| Cab-o-sil M5 | 0.4% | 0.4% | 0.4% | 0.4% | 0.4% | 0.4% | 0.4% | 0.2% | 0.2% |
| Irg. 1010 | 0.1% | 0.1% | 0.1% | 0.1% | 0.1% | 0.1% | 0.1% | 0.1% | 0.1% |
| Irg. 168 | 0.3% | 0.3% | 0.3% | 0.3% | 0.3% | 0.3% | 0.3% | 0.3% | 0.3% |
| UL-94 1.6 mm | V2 | V2 | V2 | V2 | V2 | V2 | V2 | V2 | V2 |

The invention claimed is:
1. A composition comprising:
a thermoplastic polyolefin
at least an hypophosphorous acid metal salt wherein phosphorus valence state is equal to +1, as a main flame retardant component (FR), wherein said hypophosphorous acid metal salt is aluminium hypophosphite or calcium hypophosphite;
at least a sterically hindered N-alkoxyamine as a first flame retardant synergic component (FRSYN1) having the following chemical formula (I):

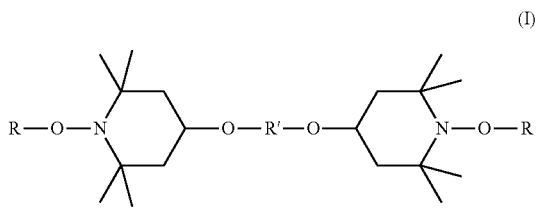

where R represents $C_1$-$C_{30}$ linear or cyclic alkyl group, and
R' is selected as C=O or C=O($CH_2$)$_8$C=O; and
at least a silicon oxide or aluminium oxide or their mixtures with acid pH ranging from 3 to 6 as a second flame retardant synergic component (FRSYN2),
wherein said composition is halogen-free.
2. A composition according to claim 1, wherein said R is a $C_7$-$C_{12}$ linear or cyclic alkyl group.
3. A composition according to claim 1, wherein said R is a $C_8$-$C_{11}$ linear or cyclic alkyl group.
4. A composition according to claim 1, wherein said sterically hindered N-alkoxy amine is bis (1-octyloxy-2,2,6,-tetramethyl-4-piperidyl) sebacate.
5. A composition according to claim 1, wherein said sterically hindered N-alkoxy amine is 4-piperidinol, 2,2,6,6-tetramethyl-1-(undecycloxy)-,4,4'-carbonate.
6. A composition according to claim 1, wherein said sterically hindered N-alkoxy amine is a mixture of 4-piperidinol, 2,2,6,6-tetramethyl-1-(undecycloxy)-,4,4'-carbonate and bis (1-octyloxy-2,2,6,-tetramethyl-4-piperidyl) sebacate.
7. A composition comprising:
a thermoplastic polyolefin or polar polyolefin,
at least aluminium hypophosphite or calcium hypophosphite,
at least bis (1-octyloxy-2,2,6,-tetramethyl-4-piperidyl) sebacate or 4-piperidinol, 2,2,6,6-tetramethyl-1-(undecycloxy)-,4,4'-carbonate or a mixtures of both, and
at least a silicon oxide or aluminium oxide or their mixtures with acidic pH ranging from pH 3 to pH 6,
wherein said composition is halogen-free.
8. A composition according to claim 7, wherein said thermoplastic polymer is high density medium density or low density polyethylene.
9. A flame retardant powder mixture useful to flame retard a polyolefin polymer for moulding different plastic articles, said powder mixture comprising:
aluminium hypophosphite or calcium hypophosphite at a concentration from 70% to 94%,
bis (1-octyloxy-2,2,6,-tetramethyl-4-piperidyl) sebacate or 4-piperidinol, 2,2,6,6-tetramethyl-1-(undecycloxy)-, 4,4'-carbonate or mixture of the both at a concentration from 3% to 15%, and
a silicon oxide or aluminium oxide or their mixture with acidic pH ranging from pH 3 to pH 6 at a concentration from 3% to 15%,
with respect to the total weight of the composition,
wherein said flame retardant powder mixture is halogen-free.
10. A composition according to claim 9, further comprising from 10% to 20% by weight respect to the total composition of a meltable solid organic phosphate flame retardant component in powder form.
11. A thermoplastic concentrate in pellet form or masterbatch useful to flame retard a polyolefin polymer for moulding different plastic articles, said thermoplastic concentrate comprising:
a thermoplastic polyolefin or polar polyolefin from 70% to 30%, and
a flame retardant powder mixture according to claim 9 from 30% to 70%,
optionally from 0% to 10% of additives
with respect to the total weight of the composition.
12. A thermoplastic concentrate in pellet form or masterbatch useful to flame retard a polyolefin polymer for moulding different plastic articles, said thermoplastic concentrate comprising:
a thermoplastic polyolefin or polar polyolefin from 70% to 30%, and
a flame retardant powder mixture according to claim 10 from 30% to 70%,
optionally from 0% to 10% of additives
with respect to the total weight of the composition.
13. A flame retarded polymer compound in pellet form for moulding different plastic articles containing:
a thermoplastic polyolefin or polar polyolefin at a concentration of 99% to 85%,
aluminium or calcium hypophosphite at a concentration of 1% to 12%,
bis (1-octyloxy-2,2,6,-tetramethyl-4-piperidyl) sebacate or 4-piperidinol, 2,2,6,6-tetramethyl-1-(undecycloxy)-, 4,4'-carbonate or mixture of the both at a concentration of 0.1-1.5%,
silicon oxide or aluminium oxide or their mixture with acidic pH ranging from pH 3 to pH 6 at a concentration of 0.1% to 1.5%,
e) optionally additives, fillers or reinforcing fibers from 0% to 40%
with respect to the total weight of the composition,
wherein said flame retarded polymer compound is halogen free.
14. The composition according to claim 1 as flame retarded polymer compound for molding plastic articles selected from: stadium, theatre seats, injection moulded electrical connectors, boxes, switches, appliances parts, artificial hairs, roofing covers, artificial turfs, pipes and fittings, corrugated pipes, building cables, automotive cables, telecommunication cables, air ducts profiles for ventilation systems, films and films for industrial packaging, fibres for carpets, spun bound and monofilament textiles, windows roller blinds, polyolefin foams for building insulation or industrial packaging.

* * * * *